Sept. 2, 1947.  E. C. SMITH  2,426,847
DITCHING MACHINE
Filed May 1, 1946  2 Sheets-Sheet 1
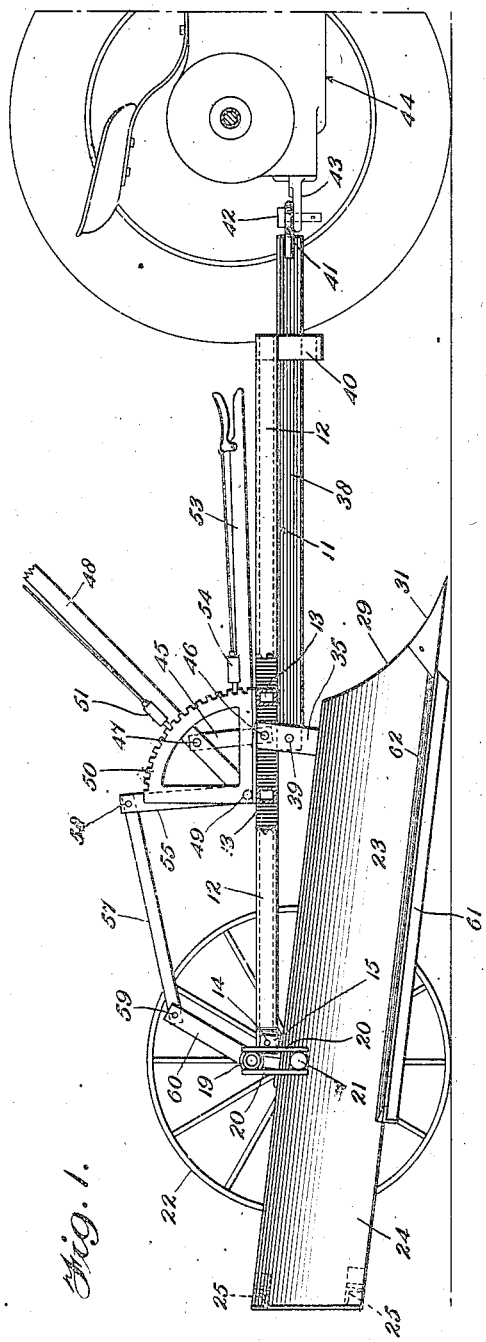
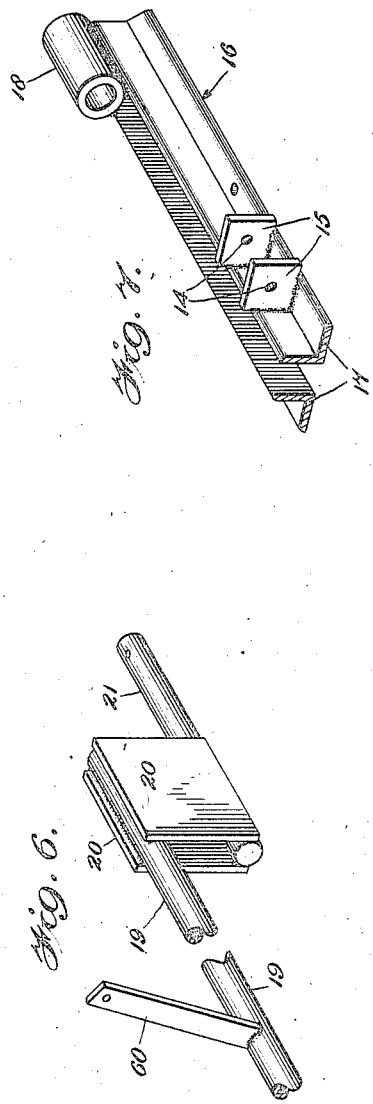
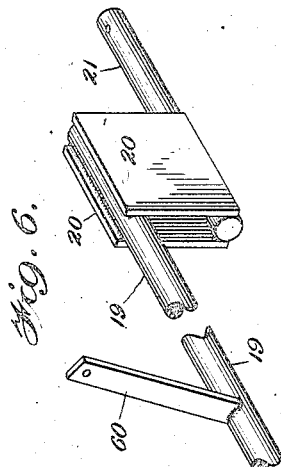
Inventor
Earl C. Smith,
Attorney

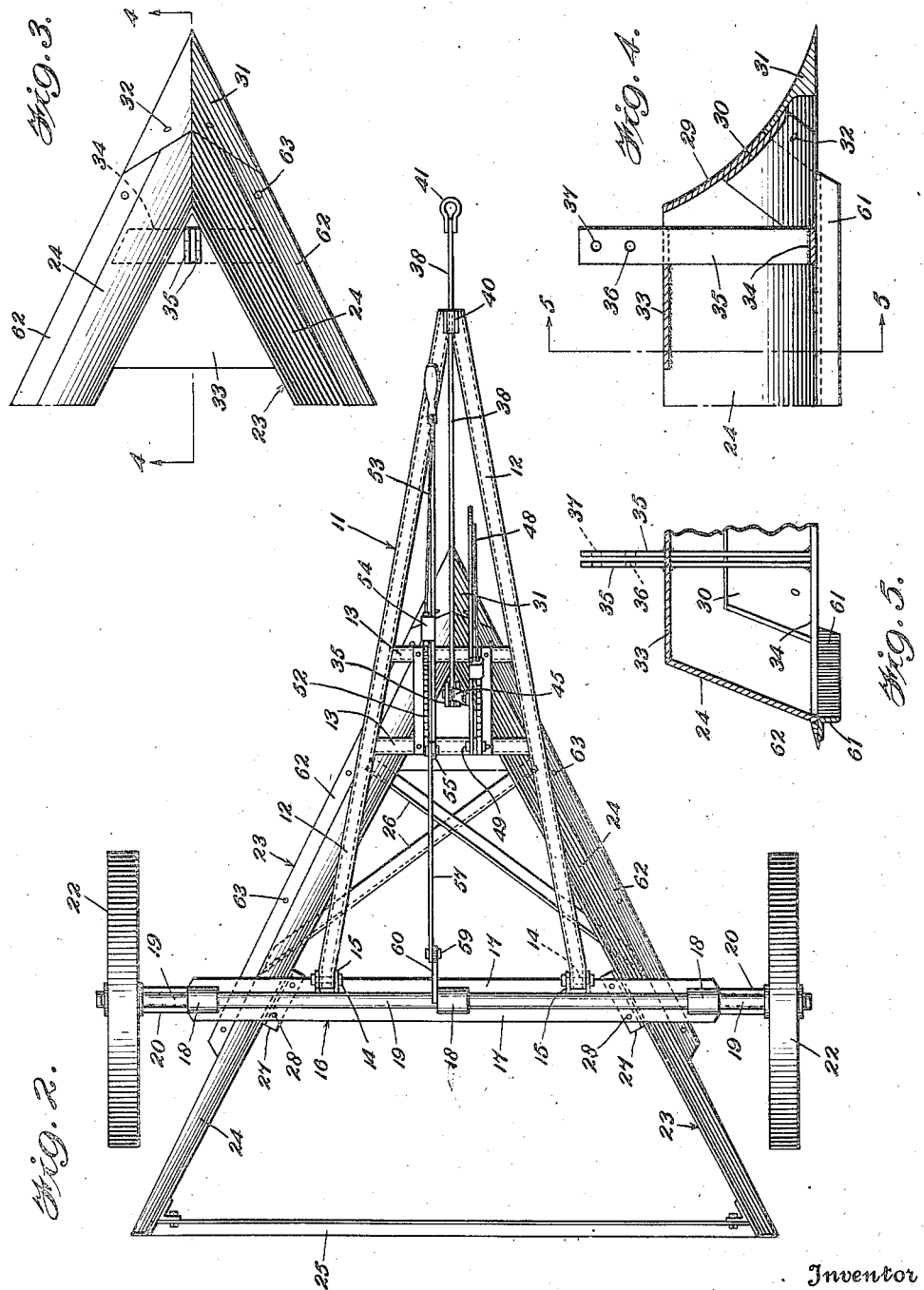

Patented Sept. 2, 1947

2,426,847

UNITED STATES PATENT OFFICE 2,426,847

DITCHING MACHINE

Earl C. Smith, Fairfield, Mont., assignor of one-half to Lewis A. Harris, Fairfield, Mont.

Application May 1, 1946, Serial No. 666,214

2 Claims. (Cl. 37—98)

The invention relates to earth excavating machines of the type extensively employed in the formation of irrigation ditches, and generally termed "ditchers," and has for its principal object the simplification and improvement of the construction of such machines whereby to reduce the cost of manufacture and maintenance, as well as to increase the efficiency and ease of operation thereof.

To these ends, the machine is of the two-wheel trailer type and is adapted to be attached to and partially supported by the draw-bar of a tractor or like automotive vehicle, by means of which it may be traversed over the ground. The excavating element is mounted for the independent elevation and depression of its forward and rearward ends whereby to control the depth and width of the excavation, and the controls for accomplishing such adjustments of said element are so constructed and arranged as to be readily operable by the tractor operator from the seat of the tractor, thus making it unnecessary either for the operator to dismount from the tractor whenever adjustment of the excavating element is required, or for a second man to ride on the ditcher in order to perform such operations.

In the accompanying drawings forming a part of this specification:

Figure 1 is a side elevational view of a ditching machine constructed in accordance with the invention, a portion of the parts being broken away and in section, and the near wheel being omitted;

Fig. 2 is a top plan view of the ditcher shown in Fig. 1;

Fig. 3 is an enlarged plan view of the forward or point portion of the excavating element;

Fig. 4 is a longitudinal sectional view on the plane indicated by the line 4—4 of Fig. 3, looking in the direction of the arrows;

Fig. 5 is a cross sectional view of the parts shown in Fig. 4, on the plane indicated by the line 5—5 thereof;

Fig. 6 is a fragmentary perspective view illustrating the construction of the cranked axle by means of which raising and lowering of the rear end of the excavating element is accomplished; and Fig. 7 is a perspective view of a portion of the transverse bar structure by means of which the excavating element is hung on the axle, and to which the main frame is connected.

In the said drawings 11 indicates the main frame of the ditcher, which is of A-shape and comprises the rearwardly divergent side members 12 and cross bars 13, all of which may be of square tubular construction as shown in Fig. 1. The rearward end of each of said side frame members 12 is pivotally connected at 14 to ears 15 rigidly carried by a transverse bar structure 16 which, as best shown in Figs. 1 and 7, comprises a pair of parallel angle irons 17 which are rigidly connected together and maintained in spaced relation by a plurality of bearing sleeves 18 welded thereto. These sleeves receive and journal the tubular axle 19, to each end of which is welded a pair of plate members 20 which rigidly carry the offset spindles 21 on which the supporting wheels 22 are journalled. The elements 19, 20 and 21 constitute a cranked axle construction by means of which the rearward portion of the excavating element may be raised and lowered relative to the surface of the ground, as will appear more fully below.

As will be best understood from Fig. 2, the excavating element 23 is of V-shape and comprises the rearwardly diverging plates 24 which may be transversely braced at their rear ends by the angle irons 25, and intermediately by the angle irons 26. Each side plate is provided with a rigid angle bracket 27 to which the bar structure 16 may be rigidly secured, as by rivets or bolts 28. The meeting forward ends of the plates 24 are curved as at 29 and welded together, and are provided with a frog 30 (Fig. 4) to which the renewable wear-resistant point member 31 is secured, as by rivets or bolts 32. The apex portion of the excavating element is reinforced by an upper triangular plate 33 and by a lower bracing member 34, each extending between and welded to the side plates 24. Spaced upright members 35 are welded to these bracing elements, and the upper ends thereof (which extend above the plate 33) are provided with a pair of apertures 36 and 37. A draft bar or tongue 38 has its rearward end disposed between and pivotally connected to the upright post members 35 by means of a pin 39 passing through the lower apertures 36 of said members. The forward portion of the draft bar passes through a depending guide yoke 40 rigidly carried by the A-frame 11 at its apex, and the forward end of the draft bar is provided with an eye 41 for readily detachable connection by means of a pin 42 with the draw bar 43 of a tractor 44.

A link 45 has its lower end disposed between the post members 35, being pivotally connected thereto by a pin 46 extending through the apertures 37 of the said members. The upper end of the link 45 is connected as at 47 to a hand lever 48 pivotally mounted as at 49 on one of the transverse bar members 13 of the A-frame 11. A toothed sector 50 is also mounted on the frame members 13 in co-operative relation to the lever 48, which is provided with a conventional spring latch 51 engageable with the teeth of the sector 50 to hold the lever in various positions, as is common in the art. By shifting the lever about its pivot 49 the forward end of the excavating element 23 may be lowered to cause the point 31 thereof to penetrate the ground to any desired depth within the range of the apparatus, and raised to clear the ground as shown in Fig. 1.

The frame cross bars 13 also carry a second toothed sector 52 which has operatively associated with it a second pivoted hand lever 53 provided with a spring latch 54 for coaction with the teeth of said sector. This lever 53 has an angularly extending arm 55 to which one end of a link 57 is pivotally connected at 58, the other end of said link being pivotally connected at 59 to an arm 60 welded or otherwise rigidly secured to the tubular axle 19. Thus, by shifting the hand lever 53 the cranked axle may be rocked to raise and lower the rear end of the excavating element 23.

The lower edge of each side plate 24 of the excavating element 23 has rigidly secured to it an angle iron 61, extending from the point member 31 through a substantial portion of the length of the plate, and having a renewable wear resistant cutting blade 62 secured to it by rivets or bolts 63.

It will be noted that the forward end of the present ditcher is supported by the tractor, thus enabling the use of but two supporting wheels for the machine, which are disposed toward the rear end thereof. This arrangement, together with the fact that the tractive force is applied through the draft bar 38 to the post 35—which is rigidly attached to the forward end of the excavating element well ahead of the wheels—above the top of the excavating element, tends to cause the point 31 to penetrate the ground, and prevent its rising therefrom. The wheels 22, being disposed outside the excavating element, run on the ground at the sides of the ditch rather than in the latter, which is of importance in cutting ditches in wet ground as well as in cleaning out old ditches.

The machine is readily maneuverable by the tractor into head ditches for the purpose of starting laterals therefrom; and it will be noted that the hand levers 48 and 53 are so arranged as to extend forwardly to a point from which they may be readily manipulated by an operator seated on the tractor, whereby it is unnecessary for him to dismount in order to adjust the excavating element, or for a second man to ride the ditcher for this purpose.

What is claimed is:

1. In a tractor-drawn ditching machine, an A-frame having rearwardly divergent side members and an intermediate cross bar; a transverse bar structure pivotally connected to the rearward ends of said frame side members; an axle journalling said bar structure and provided at each end with an offset spindle journalling a supporting wheel; a V-shaped excavating element disposed beneath the rearward portion of the A-frame between said wheels, said element comprising rearwardly divergent side plates an intermediate portion of each of which is rigidly secured to said transverse bar structure; a post extending upwardly from the convergent forward portion of said excavating element; a draft bar pivotally secured to said post and extending forwardly therefrom for attachment to and support by a tractor; a pair of manually operable levers mounted on the cross bar of the A-frame and extending forwardly therefrom for operation from the tractor seat; connections between one of said levers and said post whereby manipulation of such lever may lower and raise the forward end of the excavating element to and from excavating position; and connections between the other of said levers and said axle whereby manipulation of such lever may shift the axle to raise and lower the rearward end of the excavating element.

2. In a tractor-drawn ditching machine, an A-frame having rearwardly divergent side members and an intermediate cross bar; a transverse bar structure pivotally connected to the spaced rearward ends of said frame side members; an axle journalling said bar structure, provided at each end with an offset spindle journalling a supporting wheel; a V-shaped excavating element disposed beneath the rearward portion of the A-frame between said wheels, said element comprising rearwardly divergent side plates carried by said bar structure, a renewable point at the meeting forward ends of said plates, and laterally projecting cutting blades disposed along the lower longitudinal edges of the plates; a post rigidly carried by and extending upward from the forward portion of said excavating element; a draft bar pivotally secured to said post and extending forwardly therefrom to beyond the forward end of the A-frame, for attachment to and support by a tractor; a pair of manually operable levers mounted on the cross bar of the A-frame and extending forwardly therefrom for operation from the tractor seat; connections between one of said levers and said post whereby manipulation of such lever may lower and raise the forward end of the excavating element to and from excavating position; and connections between the other of said levers and said axle whereby manipulation of such lever may shift the axle to raise and lower the rearward end of the excavating element.

EARL C. SMITH.

REFERENCES CITED

The following references are of record in the file of this patent:

UNITED STATES PATENTS

| Number | Name | Date |
|---|---|---|
| 2,078,327 | Kinghorn | Apr. 27, 1937 |
| 2,261,874 | Cundiff | Nov. 4, 1941 |